United States Patent [19]

Reiter et al.

[11] Patent Number: 4,857,571

[45] Date of Patent: Aug. 15, 1989

[54] PREVULCANIZATION RETARDATION OF FREE-RADICAL CURED RUBBER

[75] Inventors: Ralph H. Reiter, River Vale, N.J.; C. Raymond Ekwall, Stratford, Conn.

[73] Assignee: Sartomer Company, Inc., West Chester, Pa.

[21] Appl. No.: 239,281

[22] Filed: Sep. 1, 1988

Related U.S. Application Data

[63] Continuation-in-part of Ser. No. 166,797, Mar. 3, 1988, abandoned, which is a continuation of Ser. No. 789,526, Oct. 21, 1985, abandoned.

[51] Int. Cl.⁴ ............................................. C08K 5/17
[52] U.S. Cl. ...................................... 524/248; 524/519; 524/521; 524/523; 524/524; 524/525; 524/526; 524/533; 525/259; 525/303; 525/304
[58] Field of Search ................. 524/248; 525/259, 303, 525/304, 193

[56] References Cited

U.S. PATENT DOCUMENTS

| | | | |
|---|---|---|---|
| 1,899,120 | 2/1933 | Sloan | 524/248 |
| 2,960,487 | 11/1960 | Rosenwald et al. | 524/248 |
| 3,043,774 | 7/1962 | Coffield | 524/248 |
| 3,549,587 | 12/1970 | Nicholson et al. | 524/248 |
| 3,560,432 | 2/1971 | Briggs et al. | 524/248 |
| 3,981,943 | 9/1976 | Fujio et al. | 525/259 |
| 4,097,527 | 6/1978 | Kline | 524/248 |
| 4,284,551 | 8/1981 | Argentar | 525/259 |
| 4,332,918 | 6/1982 | Fukahori et al. | 525/259 |
| 4,485,218 | 11/1984 | Bell et al. | 525/257 |

*Primary Examiner*—Joseph L. Schofer
*Assistant Examiner*—Bernard Lipman
*Attorney, Agent, or Firm*—Burns, Doane, Swecker & Mathis

[57] ABSTRACT

Prevulcanization of elastomer is inhibited by incorporation into the elastomer to be vulcanized, a minor amount of certain methyl substituted-aminoalkyl phenols as inhibitors or scorch retarders, and at least one of a polyfunctional (meth)acrylic monomer, allylic compound, or metal salt of unsaturated monocarboxylic acids which provides improved technical advantages as a reactive coagent in the cross-linking of such elastomeric compositions.

28 Claims, No Drawings

PREVULCANIZATION RETARDATION OF FREE-RADICAL CURED RUBBER

CROSS REFERENCE TO RELATED APPLICATIONS

This application is a continuation-in-part of application Ser. No. 166,797, filed Mar. 3, 1988, now abandoned, which is a continuation of application Ser. No. 789,526 filed Oct. 21, 1985, abandoned.

BACKGROUND OF THE INVENTION (1) Field of the Invention

The present invention is directed to the curing or vulcanizing of elastomers with free radical generating compounds, commonly referred to as vulcanization initiators. More particularly, the present invention relates to curable elastomer compositions in which vulcanization of the rubber is delayed by incorporating a certain methyl-substituted aminoalkyl phenol, as an inhibitor or a scorch retarder in the rubber composition to be vulcanized. The incorporation of the retarders of the present invention eliminates the use of potential carcinogenic materials or sublimeable lachrymators conventionally employed as retarders in this art. In addition, the prevulcanization inhibitors employed in the present invention exhibit better compatibility in most synthetic rubber systems, and further reduce or eliminate stain-producing residuals commonly experienced with use of Nnitroso diphenylamine retarders, conventionally employed for retardation of such elastomer compositions. Included in these systems are polyfunctional acrylic or methacrylic monomers, allylic compounds or metal salts of $\alpha,\beta$ unsaturated carboxylic acids which are incorporated into the free radical curable elastomer compositions to be retarded and which provide improved technical advantages as reactive coagents in the crosslinking of such elastomeric compositions.

(2) Description of the Prior Art

The *Vanderbilt Rubber Handbook* (1978) discloses the use of a class of compounding materials designated as scorch "retarders" in certain highly accelerated rubber stocks where unusually hot processing conditions are encountered (page 344). Illustrative examples of such materials include phthalic anhydride, salicylic acid and sodium acetate, which are listed as examples of acidic materials that act as retarders in sulfur vulcanization systems. N-nitrosodiphenylamine is also disclosed as a retarder effective in hot processing of natural and synthetic compounds. It is also disclosed that "REOGEN" also exerts some retarding effect on compounds besides aiding in processing without noticeably decreasing accelerator activity on the curing conditions. In addition, the Vanderbilt text indicates that it has become standard practice to include fatty acids, such as stearic acid, in all natural rubber compounds to modify the curing rate of natural rubbers. All of these compounding materials, in general, are described as adaptable for use in sulfur vulcanization of rubber.

Parkes, U.S. Pat. No. 3,384,613, issued May 21, 1968, describes the use of nitroaryl, nitrosoaryl and N-nitrosodiaryl amine compounds as suitable modifiers in the retardation of scorch in rubber compounds containing di-tertiary peroxides, such as dicumyl peroxide, as the vulcanizing agent. Furthermore, Cowperthwaite et al., U.S. Pat. No. 3,751,378 issued Aug. 7, 1973, discloses the use of certain N-nitrosodiphenylamines and N,N'-dinitroso para-phenol diphenylamine compounds as retarders in the prevulcanization of rubber with polyfunctional methacrylate monomers as crosslinking agents with peroxides. However, although the industry has, in the past, found the N-nitroso-aryl compounds to be practical, the advent of TOSCA and EPA examination of industrial chemicals has found that such N-nitrosoamines to be especially toxic and often carcinogenic. Another disadvantage characteristic of the N-nitroso compound retarders of the prior art is their failure to totally co-react into acrylic monomer/elastomer systems, thereby producing residual staining of the surface of the resultant rubber article.

Furthermore, the Chemical Marketing Reporter (Jan. 2, 1984) pages 4 and 21, reports that nitrosoamines have been identified as a cause of cancer, and as a result thereof, the use of such compounds in the production of baby bottle nipples and related rubber articles of manufacture has been severely limited. Such findings have caused alarm in the rubber industry and instituted a search of similar functional compounds which are capable of retarding the onset of vulcanization, while at the same time, avoiding adverse effects on the final physical, mechanical properties of the cured rubber.

In the search for such compounds relating to the present invention, the present inventors have uncovered a number of compounds such as p-benzoquinone, 1,4-naphthoquinone, 9,10anthroquinone, their aliphatic substituted analogs, as well as their dioxime derivatives, and cupferon, each of which are either known carcinogens or sublimable lachrymators, thereby rendering these materials dangerous to work with in the usual rubber compounding work environments. Finally, Japanese Pat. No. 75-151239 dated Dec. 4, 1975 discloses the use of certain amine salts of 3,5-dinitrobenzoic acid and 2,6-substituted-4-dimethylaminomethyl phenols as vulcanization accelerators for neoprene rubber in the conventional sulfur vulcanization rubber process.

SUMMARY OF THE INVENTION

The present invention provides curable elastomer compositions devoid of the afore-described drawbacks previously experienced in the retardation of scorch during rubber vulcanization, particularly when employing a free radical generating compound as a curing agent.

In accordance with the present invention, it has now been discovered that the advantages characteristic of elastomers cured with free radical generating compositions may be retained by incorporating into the free radical generating compoundcontaining uncured elastomer composition, a small modifying amount of certain alkyl aminoalkyl phenols combined with a polyfunctional monomer as described hereinafter. The employment of the retarders not only effectively retards scorching, but also reduces the elastic modulus, and increases elongation relative to unmodified cured elastomers. Furthermore, the use of the retarders of the present invention eliminates the use of carcinogenic or lachrymator compositions conventionally employed in the rubber compounding work environments for this purpose. In addition, due to the lack of dark color characteristically found in prior art retarder compositions, and as a result of the essentially colorless characteristic of the modifiers employed herein, stain-producing residuals associated with the use of these prior art compositions, such as N-nitrosoaryl amines, is totally eliminated, thereby providing rubber products free of such undesirable surface stains. Moreover, the use of the retarder compositions of the present invention preserves the aging and resiliency properties of free-radical cured elastomers since they also function as anti-oxidants. The retarders are employed with a polyfunctional acrylic or methacrylic monomer, allylic compound or metal salt of unsaturated monocarboxylic acids, as cross-linking agent for the rubber, and are capable of being totally contributing to lowering of surface staining and the potential of exposing users of the rubber article to a potentially hazardous chemical agent.

DETAILED DESCRIPTION OF THE PREFERRED EMBODIMENTS

The modifier-retarder compositions of the invention, in general, correspond to the structural formula:

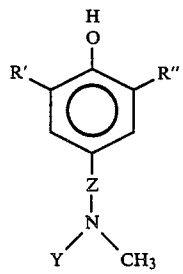

(Formula I)

wherein R' and R" are each independently lower alkyl of from 1 to 6 carbon atoms, Z is an alkylene radical containing from 1 to 12 carbon atoms, and Y is an alkyl, cycloalkyl, aryl, aralkyl radical, or a lower alkyl-substituted derivative of said aryl radicals containing from 1 to 6 carbon atoms in the alkyl chain. Preferred retarders of the present invention are compounds conforming to above Formula I, wherein R' and R" are each tertiary alkyl hydrocarbons, Z is an alkylene radical containing from 1 to 3 carbon atoms, i.e., methylene, ethylene, and propylene radicals, and Y is a lower alkyl radical containing from 1 to 6 carbon atoms. Most preferred of the retarder compounds employed in the present invention is 2,6-di-t-butyl-4-(dimethylamino)methyl phenol. It is to be understood that admixtures of compounds conforming to the above-identified formula are contemplated as being within the present invention. Representative compounds of the present invention other than the aforementioned include:

2,6-dimethyl-4-[methyl(ethyl)amino]methyl phenol
2,6-diethyl-4-[dimethylamino]methyl phenol
2,6-di-t-butyl-4-[dimethylamino]ethyl phenol
2,6-di-t-amyl-4-[dimethylamino]ethyl phenol
2,6-di-t-butyl-4-[methyl(cyclohexyl)amino]methyl phenol
2,6-di-t-butyl-4-[methyl(phenyl)amino]n-propyl phenol
2,6-di-t-amyl-4-[methyl(benzyl)amino]ethyl phenol
2,6-di-t-butyl-4[methyl(4-t-butylphenyl)amino]n-butyl phenol
2,6-di-n-propyl-4-[methyl(4-t-butylbenzyl)amino]n-propyl phenol
2,6-di-t-butyl-4-[dimethylamino]n-hexyl phenol In general, the modifier-retarder alkyl-substituted aminoalkyl phenol compositions of the present invention are employed in amounts ranging from between 0.01 to 5, preferably from about 0.1 to 2 parts per 100 parts by weight of elastomer to be cured.

Elastomers which may be treated in accordance with the invention are the elastomeric organic high polymers, including natural rubber and the various synthetic rubbers which cure i.e. vulcanize or cross-link, with a free-radical generating compound or radiation source, such as gamma radiation and high energy electrons. In general, these free radical-curable rubbers are polymers of conjugated dienes or with easily abstractible hydrogen, wherein the monomers are linked through carbon-carbon bonds. Representative examples of synthetic rubbery polymers of conjugated dienes include: synthetic polyisoprene, styrenebutadiene rubbers, polybutadiene rubbers, butyl rubber, bromobutyl rubber, chlorobutyl rubber, the neoprenes, ethylene propylene rubbers, nitrile elastomers, silicone elastomers, thermoplastic elastomers, fluoroelastomers, high styrene butadiene copolymers, vinyl acetate ethylene copolymers, chlorinated polyethylene rubber, chlorosulfonated polyethylene elastomer, and reclaimed rubber.

Advantageously, any vulcanizing agent which decomposes to produce free radicals during the cure cycle may be used as the curing or vulcanizing agent. In general, the free radical generating compound is employed in amount ranging from between about 0.1 to 10 parts, preferably from about 2 to about 5 parts, per 100 parts of elastomer to be cured. Suitable free radical generating compounds include peroxides, percarbonates, azo compounds, and the like. Ditertiary peroxide curing agents are, in general, preferred, which peroxides and their homologs and analogs, all correspond essentially to the formula:

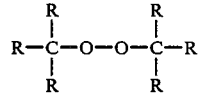

(Formula II)

These agents contain at least one peroxy group disposed between tertiary carbon atoms, which tertiary carbon atoms are linked to carbon atoms constituting portions of each of the R groups, which groups may be alkyl (including straight, branched or cyclic) alkenyl, or aryl groups, or admixtures of such groups, which may be further substituted by non-hydrocarbon groups, for example, ethers, additional peroxy groups, or halogen, such as chlorine, which do not adversely interfere with the curing process, or with the cured elastomer product. In general, the free radical generating compounds characteristically exhibit at least a one hour half life at which the temperature of the curing of the rubber is effected. Illustrative alkyl peroxides such as dicumyl peroxide, 1,1,-di-t-butyl peroxy-3,3,5-trimethyl cyclohexane, di-t-butyl peroxide, and 2,5-bis(t-butylperoxy) 2,5-dimethylhexane are commercially available and conveniently employable herein.

The present invention is based on the surprising discovery that a Mooney scorch value of at least 1, and generally, of from about 2 to about 5 minutes for a 2 point rise may be achieved by the addition of the indicated quantity of methyl substituted amino alkyl phenol inhibitor. Experiments carried out with a Monsanto Rheometer demonstrate, for all elastomer stocks responding to the rubber-free-radical cure, an initial drop in viscosity, a long holding period at temperatures of between about 160° C. and 190° C., of between about 1 and 5 minutes, or longer, and an exceptionally steep rise in viscosity during the period of between about 5 and 10 minutes, illustrating rapid cure. Cured products exhibit excellent aging, improved resiliency, tensile values, and solvent resistance in keeping with acceptable modulus values, as compared with free-radical vulcanization of elastomers devoid of the retarder compositions of the present invention.

The capability of these retarders to function so uniquely and effectively in free radical-elastomer curing is particularly unexpected in view of the disclosure contained in the above-identified Japanese patent which teaches that certain of the compounds coming within the scope of Formula I above, in fact, function as accelerators in sulfur-cured chloroprene rubber applications. Furthermore, as is more apparent from Example 4 contained herein, admixtures of organic chemical compounds bearing the identical functional groups present within the retarder compounds of the present invention, for example, the admixture of 2,6-di-t-butyl-p-cresol and N,N-dimethyl benzylamine, which contains the identical functional groups present in 2,6-di-t-butyl-4-(dimethylamino)methyl phenol, failed to exhibit any scorch retardation activity as measured by Mooney Scorch and Monsanto Rheometer curing evaluation methods; in those evaluations, Mooney Scorch Values and Rheometer Curemeter Values were determined in conventional manner, for example in accordance with ASTM D-1646-81 and in the aforedescribed manner disclosed in the Vanderbilt Handbook text, beginning at page 583 thereof.

The rubber compositions of the invention comprising the elastomer, free radical generating compound and modifier-retarder, also include one or more polyfunctional monomers, such as acrylic or methacrylic monomers, allylic cross-linking coagents such as allylic esters, ethers and cyanurates, metal salts of $\alpha,\beta$ unsaturated monocarboxylic acids, which provide significant technical advantages as reactive coagents in the cross-linking of rubber elastomers. In general, the employment of such monomers results in the reduction of substantially higher amounts of free-radical generating compounds or energy, which is required to achieve complete curing and further improves processing, which as a result of the plasticizing effect of the liquid monomer on the rubber stock, leads to greater curing efficiency and reduced manufacturing cycles. The polyfunctional monomer is generally used in a proportion to provide the maximum viscosity reduction consistent with the desirable mixing properties and the required physical properties of the rubber. Unless special hardening is desired, the polyfunctional monomer is employed in an amount of between about 0.5 and 50, and preferably between about 5 and 30, parts per 100 parts of elastomer. Illustrative polyfunctional monomers employable herein include: trimethylol propane trimethacrylate, pentaerythritol tetramethacrylate, glycerol trimethacrylate, glycerol triacrylate, trimethylol propane triacrylate, pentaerythritol tetraacrylate, trimethylol ethane trimethacrylate, trimethylol ethane triacrylate, 1,3-butylene glycol dimethacrylate, ethylene glycol dimethacrylate, 1,3-butylene glycol diacrylate, 1,4-butylene glycol dimethacrylate, polyethylene glycol 200 dimethacrylate, di-$\alpha$-olefin derived polymethylene dimethacrylates and/or acrylates and mixtures thereof with alkyl mono(meth)acrylates, dipentaerythritol tetra(penta)acrylate and methacrylate, di-trimethylol propane tetraacrylate and methacrylate, diallyl phthalate, diallyl chloroendate, diallyl isophthalate, diallyl terephthalate, triallyl cyanurate, triallyl isocyanurate, triallyl trimellitate, the diallyl ethers or the triallyl ethers of trimethylol propane, trimethylol ethane and pentaerythritol, zinc acrylate and zinc dimethacrylate (or their monobasic salts). Also employable as polyfunctional monomers are the poly(meth)acrylate derivatives of oxyalkylated polyols. In general, these monomers are produced in conventional manner by alkoxylation of the alcohol from which the poly(meth)acrylate monomer is derived with an alkylene oxide such as ethylene oxide, propylene oxide or mixtures thereof until an average of 2 to 6 alkylene oxide units have been added onto such alcohol thereby producing an alkoxylated admixture of the alcohol, followed by esterification of the oxyalkylated derivative with acrylic acid or methacrylic acid to produce the desired polyfunctional (meth)acrylate monomer.

As is appreciated by those skilled in the art, inert fillers may desirably be included in the elastomer cure compositions of the invention. Any known or conventional filler may be employed which, in general, is finely divided, i.e. less than about 20 mesh, and preferably less than about 60 mesh U.S. Standard screen size. Suitable fillers include thermal blacks (i.e. furnace, channel or lamp carbon black), silica, silicates, zinc oxide, cork, titania, cotton floc, cellulose floc, leather fiber, plastic fiber, plastic flour, leather flour, fibrous fillers such as asbestos, glass and synthetic fibers, metal oxides and carbonates, and talc. In addition, impact modifiers such as ultra-high molecular weight polyethylene and acrylonitrile-butadiene-styrene (ABS) resin may also be used. The amount of inert filler is dictated by its type and the ultimate intended use of the elastomer composition, and in general, is less than about 30 parts per 100 parts of elastomer base, and more preferably, less than about 15 parts.

Other adjuvants conventionally employed in formulation of elastomer curing compositions, such as antioxidants, plasticizers and the like, may also be included in the composition of the invention in minor amounts, i.e., up to about 5%, and colorants up to about 10%, based on the weight of the composition.

In the production of articles of manufacture from the curable compositions of the invention, the reactant ingredients are normally intimately admixed, using for example, conventional rubber mixing rolls or a Banbury mixer, until the composition is uniform. The temperature of the mixing operation is not critical, but should be below temperatures at which the curing reaction commences, i.e., below the ten-hour half-life decomposition temperature of the free radical generating compound employed. In general, normal rubber milling practice is employed.

The molding of the curable composition is effected in conventional manner, for example, by transfer, compression or injection molding techniques. The molding temperatures may vary depending on the ingredients of the particular composition used, and may, for example, range from between about 200° F. and 400° F. Curing times, in general, range from about 6 to 60 minutes and preferably from about 10 to 30 minutes. Elastomer products prepared according to the present invention exhibit exceptional prerequisites. Hence, such compositions may be used in vehicle tires, electrical insulation and generally wherever an ageresistant, resilient, flexible and extensible elastomer is required. As an additional benefit, any residue of the retardant which remains after curing contributes materially towards aging resistance of the finished elastomeric products.

The following examples will serve to illustrate the invention, but it is understood that these examples as well as other embodiments set forth in the specification are merely representative of the invention and do not necessarily limit the scope thereof. In the examples and throughout the specification and claims, all parts and percentages are by weight unless otherwise expressly stated.

EXAMPLE I (with Comparative Example 1)

A masterbatch of rubber is prepared by masticating 400 parts of Royalene 100 ethylene propylene diene (EPDM) rubber (Uniroyal, Inc.) on a two roller mill until a typical flux roll is created at the nip of the rollers. Thereafter 240 parts of ASTM N-762 carbon black, 4 parts of calcium stearate and 20 parts of zinc oxide are added and mixed on the mill until a uniform, smooth band is developed on the front roll. The compound is then sheeted from the mill and allowed to cool on a cold flat surface while the mill rollers are cooled to below 38° C. with internal water cooling.

When the mill rollers are cooled to below 38° C., the sheet is rebanded on the mill to again produce an active flux roll at the nip. At this point 36 parts of Dicup 40 KE dicumyl peroxide (Hercules) are slowly added to the flux roll at a rate equal to the rate of absorption of the liquid. When all is added, the band is sheeted and folded, rebanding the compound onto the mill for mixing. This process is repeated 6 times to ensure thorough mixing and uniform dispersion (care is taken not to exceed 60° C. stack temperature).

To a cooled mill (less than 38° C.) a 175 part aliquot of the masterbatch is rebanded. Thereafter, the quantities indicated in TABLE I, below, of retarders are added to each compound (masterbatch) and mill mixed as described above for uniform dispersion. The rolled sheeted compound stock is allowed to cool overnight (18 hours) and finally each test plug specimen is placed into a Monsanto Oscillating Disc Rheometer (Curemeter) which had been preheated at 340° F. and stabilized at this temperature. The plugs were molded for 12 minutes. One, two and five per cent rise in Scorch Times ($T_{g1}$ $T_{g2}$ and $T_{g5}$) were recorded along with the maximum torque (MHR). The results are set forth in Table I, below.

TABLE I

| Composition | Example 1 (parts) | Comparative Example 1 (parts) |
|---|---|---|
| Royalene 100 Masterbatch | 175 | 175 |
| 2,6-Di-t-butyl-4-(dimethylamino) methyl phenol | 3 | — |
| Rheometer Results |  |  |
| Scorch Time $T_{g1}$ min. | 2.6 | 1.1 |
| Scorch Time $T_{g2}$ min. | 3.4 | 1.4 |
| Scorch Time $T_{g5}$ min. | 7.6 | 2.4 |
| Maximum Torque MHR (in-lbs.) | 12.1 | 18.8 |

EXAMPLE II

Employing the milling and compounding procedure of above Example I, nitrile rubber compounds characterized in Table II, below, were prepared and subsequently tested in the Monsato Rheometer as described in Example I, above.

TABLE II

| Composition: | Parts |
|---|---|
| Masterbatch Mix |  |
| Polybutadiene Acrylonitrile Copolymer Hycar 1042 | 400 |
| Zinc Oxide | 20 |
| Filler (N-762 Black) | 260 |
| Dioctyl Phthalate | 60 |
| Silica (HiSil 233) | 40 |
| Dicumyl Peroxide (Dicup-40-KE) | 16 |

The above masterbatch admixture is cooled to room temperature before 200 parts thereof are rebanded onto a cool two roll mill in preparation for compounding the final ingredients into the masterbatch. Prior to this last operation, solutions are prepared as listed in Table II(A) and II(B) which include respectively a liquid and solid metal acrylate coagent crosslinker and the specified retarder compounds. Compounds were tested in the Monsanto Rheometer at 340° F. and the results are listed below.

TABLE II(A)

| | Liquid Coagent and Retarder | |
|---|---|---|
| Composition | Example II (parts) | Comparative Example II (parts) |
| Nitrile Rubber Masterbatch | 100 | 100 |
| Trimethylol Propane trimethacrylate coagent (SR 350) | 19.4 | 20 |
| 2,6-di-t-butyl-4-(dimethyl amino) methyl phenol | 0.6 | none |
| Rheometer Results: |  |  |
| Scorch time $T_{s1}$ min. | 2.0 | 1.0 |
| Scorch time $T_{s2}$ min. | 2.2 | 1.1 |
| Scorch time $T_{s5}$ min. | 2.4 | 1.3 |
| Maximum Torque MHR (in-lbs.) | 39.9 | 49.2 |

TABLE II(B)

| | Solid Metal Coagent and Retarder | | | |
|---|---|---|---|---|
| Composition | 1 | 2 | 3 | 4 |
| Nitrile Rubber Masterbatch | 100 | 100 | 100 | 100 |
| Zinc Diacrylate (coagent) | 20 | 20 | — | — |
| Zinc Dimethacrylate (coagent) | — | — | 20 | 20 |
| 2,6-dit-butyl-4-(dimethylamino) methyl phenol | 0.45 | — | 0.45 | — |
| Rheometer Results: |  |  |  |  |
| Scorch Time $T_{s1}$ min. | 1.9 | 1.0 | 1.8 | 1.2 |
| Scorch Time $T_{s2}$ min. | 2.1 | 1.2 | 2.0 | 1.3 |
| Scorch Time $T_{s5}$ min. | 2.5 | 1.6 | 2.4 | 1.7 |
| Maximum Torque MHR (in-lbs) | 54.6 | 53.5 | 44.0 | 47.0 |

EXAMPLE III (with Comparative Example 3)

TABLE III

| Masterbatch Mix | Parts |
|---|---|
| Chlorinated Polyethylene Rubber 0136 (Dow) | 100 |
| Maglite D 10 |  |

TABLE III-continued

| Masterbatch Mix | Parts |
| --- | --- |
| Filler (N-991 Black) | 40 |
| Filler (N-330 Black) | 25 |
| Triisooctyltrimellitate (TIOTM) | 8 |
| Silica (HISIL 233) | 10 |
| Dicumyl Peroxide | 5 |

The above masterbatch admixture is cooled to room temperature before 200 parts thereof are rebanded onto a cool two roll mill in preparation for compounding the final ingredients into the masterbatch. Prior to this last operation, solutions are prepared as listed in Table III(A) which included a coagent crosslinker and the specified retarder compound. Compounds were tested in the Monsanto Rheometer at 340° F. and the results are listed below.

TABLE III(A)

| Composition | Example II (parts) | Comparative Example II (parts) |
| --- | --- | --- |
| Chlorinated Polyethylene Rubber masterbatch | 198 | 198 |
| Thrimethylol Propane trimethacrylate | 2.5 | 2.5 |
| 2,6-Di-tert-butyl-4-(dimethyl amino) methyl phenol | 0.12 | |
| Rheometer Results: | | |
| Scorch Time $Ts_1$ min. | 1.2 | 0.7 |
| Scorch Time $Ts_2$ min. | 1.3 | 0.9 |
| Scorch Time $Ts_5$ min. | 1.7 | 1.2 |
| Maximum Torque MHR (in-lbs) | 36.4 | 38.0 |

The aforedescribed Examples demonstrate that the incorporation of an illustrative methylsubstituted aminoalkyl phenol of the invention into a typical commercially available elastomer retards the scorch time or onset of curing of the elastomer, without sacrificing substantial modulus as represented by the torque, when compared with elastomers devoid of such retarder.

EXAMPLE IV

The following experiments were effected to evaluate the scorch retardation activity of an illustrative retarder compound of the invention, namely 2,6-di-t-butyl-4-(dimethylamino)methyl phenol, with molecular component compounds having the identical functional groups to determine whether such components, when admixed physically, provide comparative scorch retardation activity.

Employing the milling and compounding procedure of Example II, above, nitrile rubber compounds characterized in Table IV, below were prepared and tested in the Monsato Rheometer at 70° C. for 20 minutes.

TABLE IV

| Masterbatch Mix | (Parts) |
| --- | --- |
| Polybutadiene Acrylonitrile Copolymer (Hycar 1042) | 100 |
| Zinc oxide | 5 |
| Filler (N-726 black) | 65 |
| Dioctyl Phthalate | 15 |
| Silica (HISIL 233) | 10 |
| Dicumyl Peroxide (DICUP-40-KE) | 4 |

The results obtained are set forth in Table IV(A) below:

TABLE IV(A)

| Composition: | A | B | C |
| --- | --- | --- | --- |
| Nitrile Rubber Masterbatch | 50.0 | 50.0 | 50.0 |
| Trimethylol Propane Trimethacrylate (SR350) | 4.76 | 4.76 | 4.76 |
| 2,6-Di-t-butyl-4-(dimethyl amino)-methyl phenol | 0.24 | — | — |
| 2,6-Di-t-butyl-4-methylphenol (BHT) | — | 0.24 | — |
| 1:1 Wgt. ratio admixture (BHT: N,N—dimethyl benzylamine) | — | — | 0.24 |
| Rheometer Results: | | | |
| Scorch Time $Ts_1$ min. | 1.8 | 1.3 | 1.0 |
| Scorch Time $Ts_2$ min. | 2.0 | 1.4 | 1.1 |
| Scorch Time $Ts_5$ min. | 2.2 | 1.6 | 1.3 |
| Maximum Torque MHR (in-lbs) | 38.6 | 42.6 | 45.8 |

As is evident from the results set forth in Table IV(A) above, although the tertiary-butyl-phenol compounds employed as constituents of Composition A and B of Table IV(A) were hindered phenols of similar structure, the composition of the invention was clearly superior in scorch retardation. Furthermore, the admixture of BHT and N,N-dimethyl-benzylamine employed as a constituent of Composition C of Table IV(A) fails to duplicate the scorch retardation activity of the composition illustrative of the present invention, thereby demonstrating that the scorch retardation observed in the invention is unexpected. Although the invention is not to be limited thereby, it is believed that the scorch retardation properties of the compounds of the present invention may be due to intramolecular electronic inductive effects, believed to be present between the hydroxyl group and the methylamino moiety.

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A curable elastomer composition, comprising:
   (a) a free radical-curable elastomer capable of being vulcanized with a free radical generating compound;
   (b) a free radical generating compound present as curing agent in an amount of between about 0.1 and about 10 parts by weight per 100 parts by weight of the elastomer;
   (c) a polyfunctional monomer coagent capable of reacting with said free radical generating compound to crosslink said elastomer, present in an amount of from about 0.5 to about 50 parts by weight per 100 parts by weight of the elastomer;
   (d) a vulcanization inhibitor corresponding to the formula:

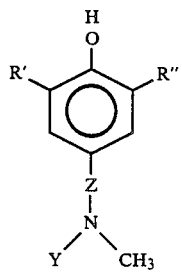

(Formula I)

wherein R' and R" are each independently lower alkyl of from 1 to 6 carbon atoms, Z is an alkylene radical containing from 1 to 12 carbon atoms, and Y is a member selected from the group consisting of an alkyl, cycloalkyl, aryl, alkaryl and aralkyl radical containing from 1 to 12 carbon atoms, said inhibitor being present in an amount of from about 0.01 to about 5 parts, by weight, per 100 parts by weight of the elastomer;

wherein said free radical curable elastomer is selected from the group consisting of synthetic polyisoprene, styrenebutadiene elastomer, polybutadiene elastomer, butyl elastomer, bromobutyl elastomer, chlorobutyl elastomer, a neoprene, ethylene propylene elastomer, a nitrile elastomer, a fluoroelastomer, a high styrene butadiene copolymer, a vinyl acetate ethylene copolymer, chlorinated polyethylene elastomer, a chlorosulfonated polyethylene elastomer, reclaimed elastomer and mixtures thereof; and wherein said polyfunctional monomer coagent is selected from the group consisting of trimethylol propane trimethacrylate, pentaerythritol tetramethacrylate, glycerol trimethacrylate, glycerol triacrylate, trimethylol propane triacylate, pentaerythritol tetraacrylate, trimethylol ethane trimethacrylate, trimethylol ethane triacrylate, 1,3-butylene glycol dimethacrylate, ethylene glycol dimethacrylate, 1,3-butylene glycol diacrylate, 1,4-butylene glycol dimethacrylate, polyethylene glycol 200 dimethacrylate, a di-α-olefin derived polymethylene diacrylate or methacrylate, and mixtures of any of the above with an alkyl mono(meth-)acrylate, dipentaerythritol tetra(penta)acrylate and methacrylate, di-trimethylol propane tetraacrylate and methacrylate, diallyl phthalate, diallyl chloroendate, diallyl isophthalate, diallyl terephthalate, triallyl cyanurate, triallyl isocyanurate, triallyl trimellitate, the diallyl ethers or the triallyl ethers of trimethylol propane, trimethylol ethane and pentaerythritol, zinc diacrylate or the monobasic salts thereof, zince dimethacrylate or the monobasic salts thereof, a poly(meth)acrylate derivative of an oxyalkylated polyol and mixtures thereof.

2. The composition of claim 1, wherein said elastomer is an elastomeric high polymer comprising conjugated diene monomers linked through carbon-carbon bonds.

3. The composition of claim 1 wherein said elastomer is a member selected from the group consisting of nitrile, ethylene-propylene diene, chlorinated polyethylene, chlorosulfonated polyethylene, polybutadiene and natural elastomer.

4. The composition of claim 1 wherein said elastomer is a nitrile elastomer.

5. The composition of claim 1 wherein said elastomer is natural rubber.

6. The composition of claim 1 wherein R' and R" are each tertiary alkyl radicals.

7. The composition of claim 6 wherein Y is lower alkyl containing from 1 to 6 carbon atoms.

8. The composition of claim 7 wherein Z is lower alkyl containing of from 1 to 6 carbon atoms.

9. The composition of claim 8 wherein Y is methylene.

10. The composition of claim 1 wherein said free radical generating compound is an organic peroxide.

11. The composition of claim 10 wherein said peroxide is a di-tertiary peroxide.

12. The composition of claim 11 wherein said peroxide is di-tertiary butyl peroxide.

13. The composition of claim 11 wherein said peroxide is dicumyl peroxide.

14. The composition of claim 1 wherein said polyfunctional monomer coagent is a (meth)acrylate monomer.

15. The composition of claim 14 wherein said coagent is trimethylol propane trimethacyrlate.

16. The composition of claim 14 wherein said coagent is 1,3-butylene glycol dimethacrylate.

17. The composition of claim 14 wherein said coagent is pentaerythritol tetramethacrylate.

18. The composition of claim 14 wherein said (meth)acrylate monomer comprises an alkoxylated admixture of (meth)acrylate monomer.

19. The composition of claim 11 wherein said polyfunctional monomer coagent is zinc diacrylate or a monobasic salt thereof.

20. The composition of claim 1 wherein said polyfunctional monomer coagent is zinc dimethacrylate or a monobasic salt thereof.

21. The composition of claim 3 wherein said vulcanization inhibitor is 2,6-ditertiarybutyl-4-(dimethylamino)methyl phenol.

22. The composition of claim 13 wherein said vulcanization inhibitor is 2,6-di-t-butyl-4-(dimethylamino)methyl phenol.

23. A cured elastomeric composition provided by curing the composition of claim 1.

24. A cured elastomeric composition provided by curing the composition of claim 21.

25. A curable elastomer composition, comprising:
(a) a free radical curable elastomer comprising nitrile rubber, ethylene-propylene diene rubber or a chlorinated polyethylene rubber;
(b) from about 0.1 to about 10 parts by weight per 100 parts by weight of the elastomer of a free radical generating compound comprising an alkyl peroxide;
(c) from about 0.5 to about 50 parts by weight per 100 parts by weight of the elastomer of a polyfunctional monomer coagent comprising trimethylol propane trimethacrylate, zinc diacrylate or zinc dimethacrylate;
(d) a vulcanization inhibitor comprising 2,6-di-t-butyl-4-(dimethylamino)methyl phenol.

26. The composition or claim 25 wherein said rubber comprises polybutadiene acrylonitrile copolymer, wherein said free radical generating compound comprises dicumyl peroxide, wherein said polyfunctional monomer coagent comprises trimetholyl propane trimethacrylate, and wherein said vulcanization inhibitor comprises 2,6-di-t-butyl-4-(dimethylamino)methyl phenol.

27. The composition of claim 25 wherein said rubber comprises polybutadiene acrylonitrile copolymer, wherein said free radical generating compound comprises dicumyl peroxide, wherein said polyfunctional monomer coagent comprises zinc diacrylate or zinc dimethacrylate and wherein said vulcanization inhibitor comprises 2,6-di-t-butyl-4-(dimethylamino)methyl phenol.

28. The composition of claim 25 wherein said rubber comprises chlorinated polyethylene rubber, wherein said free radical generating compound comprises dicumyl peroxide, wherein said polyfunctional monomer coagent comprises trimethylol propane trimethacrylate and wherein said vulcanization inhibitor comprises 2,6-di-t-butyl-4-(dimethylamino)methyl phenol.

* * * * *

UNITED STATES PATENT AND TRADEMARK OFFICE
CERTIFICATE OF CORRECTION

PATENT NO. : 4,857,571

DATED : August 15, 1989

INVENTOR(S) : Ralph H. Reiter, Raymond Ekwall

It is certified that error appears in the above-identified patent and that said Letters Patent is hereby corrected as shown below:

Column 1, line 30, "Nnitroso" should read --N-Nitroso--.
Column 2, line 28, "10anthroquinone" should read --10-anthroquinone--.
Column 2, line 52, "compoundcontaining" should read --compound-containing--.
Column 6, line 66, "ageresistant" should read --age-resistant--.
Column 8, line 53, in Table II(B), "2,6-dit-butyl-4-" should read --2,6-di-t-butyl-4--.
Column 9, line 26, in Table III(A) "Thrimethylol Propane" should read --Trimethylol Propane--.
Column 9, line 56, "70°C." should read --170°C.--.
Column 11, lines 47 and 48 and also in Column 12 lines 28 and 29, "(meth-)acrylate" should read --(meth)acrylate--.
Column 12, line 63, "or" should read --of--.

Signed and Sealed this

Twenty-fifth Day of June, 1991

Attest:

HARRY F. MANBECK, JR.

Attesting Officer

Commissioner of Patents and Trademarks